(12) United States Patent
White (10) Patent No.: US 12,425,796 B2
(45) Date of Patent: Sep. 23, 2025

(54) CONTENT-BASED AUDIO SPATIALIZATION

(71) Applicant: Bose Corporation, Framingham, MA (US)

(72) Inventor: Brian R. White, Hudson, MA (US)

(73) Assignee: Bose Corporation, Framingham, MA (US)

( * ) Notice: Subject to any disclaimer, the term of this patent is extended or adjusted under 35 U.S.C. 154(b) by 218 days.

(21) Appl. No.: 18/238,668

(22) Filed: Aug. 28, 2023

(65) Prior Publication Data

US 2025/0080940 A1   Mar. 6, 2025

(51) Int. Cl.
*H04S 7/00*    (2006.01)
*G06F 3/16*    (2006.01)
*H04R 5/033*   (2006.01)
*H04R 5/04*    (2006.01)

(52) U.S. Cl.
CPC .............. *H04S 7/304* (2013.01); *G06F 3/165* (2013.01); *H04R 5/033* (2013.01); *H04S 2400/11* (2013.01)

(58) Field of Classification Search
CPC ......... H04S 7/304; G06F 3/165; H04R 5/033; H04R 5/04
USPC .............................. 381/303, 300, 1, 304, 305
See application file for complete search history.

(56) References Cited

U.S. PATENT DOCUMENTS

| | | | |
|---|---|---|---|
| 2018/0332424 A1 | 11/2018 | Edry et al. | |
| 2019/0320282 A1 | 10/2019 | Moeller | |
| 2022/0103963 A1* | 3/2022 | Satongar | H04N 7/147 |
| 2023/0104111 A1 | 4/2023 | Prateek et al. | |
| 2023/0362579 A1* | 11/2023 | Javeri | H04S 7/40 |

OTHER PUBLICATIONS

PCT International Search Report and Written Opinion for International Application No. PCT/US2024/037317, dated Oct. 14, 2024, 9 pages.

* cited by examiner

*Primary Examiner* — Thjuan K Addy
(74) *Attorney, Agent, or Firm* — Hoffman Warnick LLC (57) ABSTRACT

Various implementations include audio devices and methods for spatializing audio output based on content. Certain implementations include at least one audio output device for providing an audio output based on data, and at least one controller coupled with the at least one audio output device, the controller configured to, use the data to determine a content type for the audio output from a group of content types, automatically select a spatialization mode for the audio output from a plurality of spatialization modes based on the determined content type, and apply the selected spatialization mode to the audio output.

20 Claims, 5 Drawing Sheets

CONTENT-BASED AUDIO SPATIALIZATION

TECHNICAL FIELD

This disclosure generally relates to audio systems. More particularly, the disclosure relates to content-based audio spatialization in audio systems.

BACKGROUND

Certain types of audio content can benefit from spatialization, for example, providing an immersive experience for the user. However, it may not be desirable to spatialize all types of content, or all types of content similarly. Conventional approaches to spatialization can limit the user experience.

SUMMARY

All examples and features mentioned below can be combined in any technically possible way.

Various implementations include approaches for spatializing audio output based on content characteristics. Additional implementations include devices such as wearable audio devices configured to render spatialized audio output based on content characteristics.

In some particular aspects, an audio system includes: at least one audio output device for providing an audio output based on data; and at least one controller coupled with the at least one audio output device, the controller configured to, use the data to determine a content type for the audio output from a group of content types, automatically select a spatialization mode for the audio output from a plurality of spatialization modes based on the determined content type, and apply the selected spatialization mode to the audio output.

In additional particular aspects, a method of controlling audio output at an audio device includes: using data to determine a content type for the audio output from a group of content types, automatically selecting a spatialization mode for audio output at the audio device from a plurality of spatialization modes based on the determined content type, and applying the selected spatialization mode to the audio output.

Implementations may include one of the following features, or any combination thereof.

In some cases, data associated with an audio output includes audio data such as audio metadata.

In some cases, automatically selecting the spatialization mode for the audio output is performed without a user input.

In certain aspects, the group of content types is predefined.

In particular implementations, the content type is determined using a content classifier.

In some aspects, the content classifier is a machine learning content classifier.

In certain cases, the content type is determined based on dynamic range of sample of the audio from the source. In particular implementations, the content classifier is updated over time, with more classifier/audio data comparisons and/or user feedback adjustments.

In some aspects, analyzing the data includes analyzing metadata to determine the content type.

In some aspects, determining the content type of the data is based on a confidence interval.

In some aspects, the confidence interval includes a probabilistic indicator that the data belongs to one of the group of content types.

In some aspects, the group of content types includes at least three distinct content types and wherein the plurality of spatialization modes includes at least three distinct spatialization modes.

In particular cases, groups of content types can include subgroups and/or subgenres, such as action, drama, comedy, news, musical, etc.

In some aspects, one of the plurality of spatialization modes includes a non-spatialized audio output.

In some aspects, the group of content types includes two or more of, i) talk-based audio content, ii) music-based audio content, iii) theatrical audio content, and iv) live-event audio content. In certain examples, talk-based audio content includes podcasts and talk shows, and music-based audio content includes mixed musical content such as content including music and dialog.

In some aspects, the controller is further configured, after applying the selected spatialization mode to the audio output, to receive a user command at the wearable audio device, and modify the selected spatialization mode based on the user command.

In some aspects, applying the selected spatialization mode first requires confirmation via a user interface command.

In some aspects, selecting the spatialization mode for the audio output is further based on a type of the wearable audio device.

In some aspects, the controller is configured to select a default spatialization mode for the audio output based on the type of the wearable audio device.

In some aspects, the type of wearable audio device includes an open-ear wearable audio device and in response to the controller detecting movement of the wearable audio device, determining whether the data is related to video output, if the data is related to video output, either fixing spatialization of the audio output to a video device providing the video output or disabling spatialization, or if the data is not related to video output, fixing spatialization of the audio output to a user head position. In particular cases, disabling spatialization is adjusted based on a hysteresis factor.

In some aspects, the type of wearable audio device includes an in-ear wearable audio device, an on-ear wearable audio device, an over-ear wearable audio device, or a near-ear wearable audio device.

In some aspects, the controller is further configured to coordinate the selected spatialization mode with audio output at one or more speakers external to the wearable audio device.

In some aspects, the one or more speakers includes at least one of, a soundbar, a home entertainment speaker, a smart speaker, a portable speaker, or a vehicle speaker.

In some aspects, a wearable audio device further includes an orientation sensor.

In certain examples, the orientation sensor includes a magnetometer, gyroscope and/or accelerometer. In one example, the orientation sensor includes an inertial measurement unit (IMU). In additional examples, the orientation sensor can include vision-based sensors, such as cameras or lidar. In further examples, the orientation sensor can include Wi-Fi and/or Bluetooth connectivity and be configured to calculate angle of arrival (AoA) and/or angle of departure (AoD) data. In particular examples, the orientation sensor is configured to communicate over local area network (LAN) standards such as IEEE 802.11.

In some aspects, the controller is further configured to, determine an orientation of the user of the wearable audio device based on data from the orientation sensor, and adjust the selected spatialization mode based on the determined orientation of the user.

In various implementations, the orientation of the user is determined based on one or more of the look direction of the user, the direction the wearable audio device is pointing in space, or the orientation of the wearable audio device relative to an external audio device such as a speaker in the area.

In some aspects, adjusting the selected spatialization mode includes disabling spatialization of the audio output in response to detecting a sudden change in the orientation of the user.

In particular cases, a sudden change in orientation is detected when orientation and/or position of the user changes significantly (e.g., satisfying an orientation/position threshold) within a period. In certain cases, a significant change in orientation or position over a period (e.g., several seconds or less) qualifies as sudden.

In some aspects, adjusting the selected spatialization mode is based on at least one head tracking (HT) algorithm selected from, fixed to head HT, fixed to external device HT, or hysteresis HT.

In some aspects, the controller is further configured to select the spatialization mode based on at least one secondary factor including, user movement, proximity to a multimedia device, proximity to an external speaker, proximity to another wearable audio device, or presence in a vehicle.

In some aspects, at least a portion of the controller is configured to run on a processor at a connected speaker or wearable smart device.

In some aspects, the controller is further configured to adjust the selected spatialization mode as additional data is received.

In some aspects, the spatialization mode accounts for at least one of a first order reflection, a second order reflection, or a late reverberation.

In some aspects, the data includes data about at least one of, a number of channels in the audio output, encoding information about the audio output, or a type of the audio (e.g., DOLBY Atmos with a 5.1 baseline track and object data such as x-y-z coordinate data).

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that adaptively spatializing audio output based on content can enhance the user experience.

Conventional audio systems employ spatialization and other audio output adjustments without consideration for content type. Because different types of content can benefit from spatialization and orchestration in distinct ways, these conventional systems have deficiencies.

The systems and methods disclosed according to various implementations use content data to adaptively control a spatialization mode for audio output. A particular approach includes automatically selecting a spatialization mode for audio output from a plurality of spatialization modes based on a determined content type, and applying the selected spatialization mode to the audio output.

Commonly labeled components in the FIGURES are considered to be substantially equivalent components for the purposes of illustration, and redundant discussion of those components is omitted for clarity.

Figure 1:
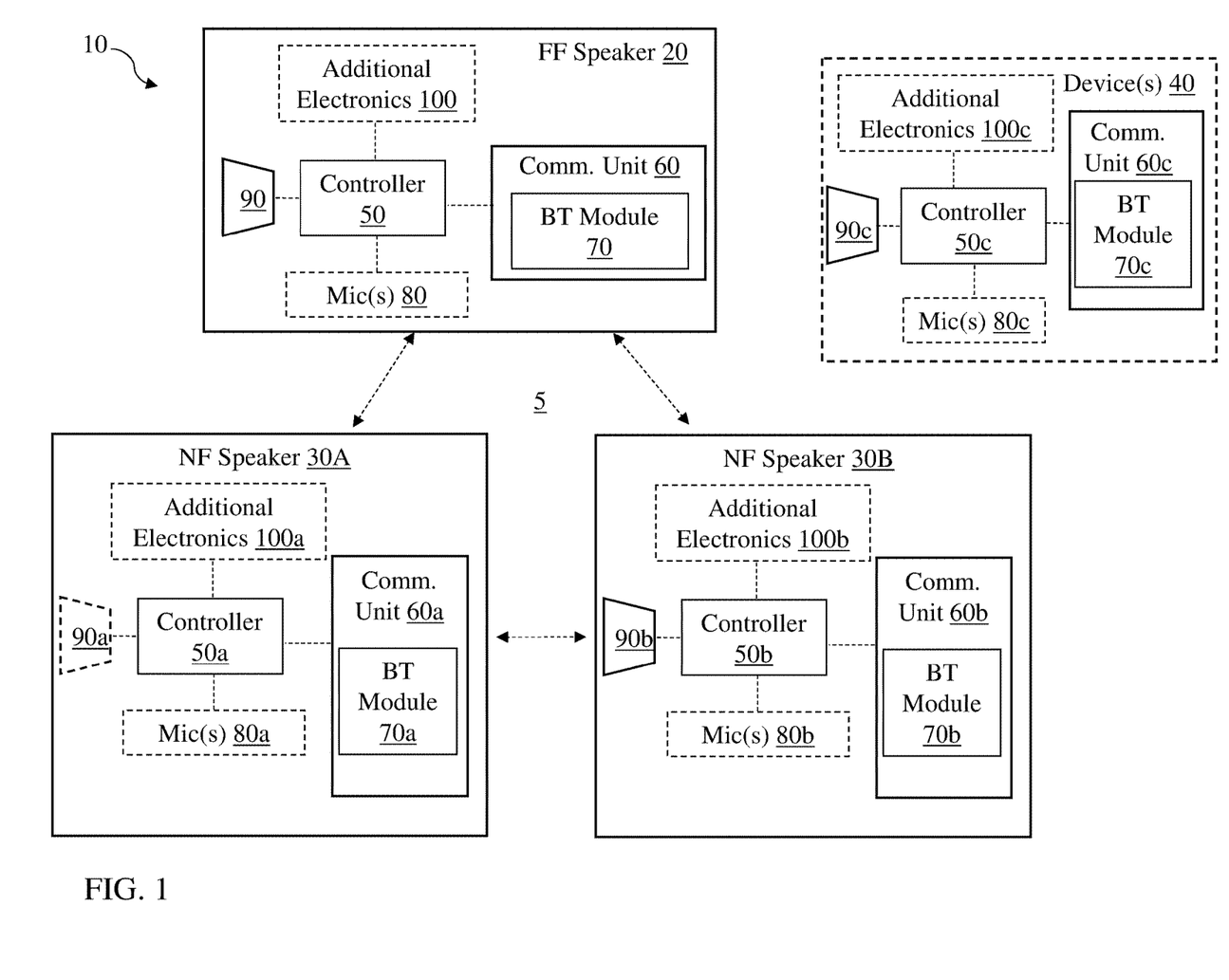
FIG. 1 is a block diagram of a system including a set of speakers according to various disclosed implementations.

FIG. 1 shows an example of a space 5 including a system 10 including a set of devices according to various implementations. In various implementations, the devices shown in system 10 include at least one far-field (FF) speaker 20 and a pair of near-field (NF) speakers 30A, 30B. In certain implementations, the NF speakers 30A, 30B are part of a wearable audio device such as two earphones in a wearable audio device. In certain examples, the NF speakers 30A, 30B are respective earbuds in a wireless pair of earphones. In other examples, the NF speakers 30A, 30B are part of an on-ear or other on-head set of earphones which may be occluding (designed to obstruct the user's ear canal opening while in use) or non-occluding (designed to leave the leave the user's ear canal unobstructed while in use).

One or more additional device(s) 40 are shown, which are optional in some implementations. The additional device(s) 40 can be configured to communicate with the FF speaker 20, NF speaker(s) 30A, 30B and/or other electronic devices in the space 5 using any communications protocol or approach described herein. In certain aspects, the system 10 is located in or around space 5, e.g., an enclosed or partially enclosed room in a home, office, theater, sporting or entertainment venue, religious venue, etc. In some cases, the space 5 has one or more walls and a ceiling. In other cases, the space 5 includes an open-air venue that lacks walls and/or a ceiling.

In various implementations, the at least one far-field speaker 20 includes an audio device not intended for wear by a user, e.g., a stand-alone loudspeaker or a set of loudspeakers such as a soundbar, portable speaker, hard-wired (i.e., semi-permanent or installation-type) speaker, etc. While the speaker 20 is described as a "far-field" device, it is not necessary that the speaker 20 be located within the generally accepted "far-field" acoustic distance relative to any other device in the system 10. That is, the far-field speaker(s) 20 need not be located in the far field to function according to the various implementations described herein. In various implementations, the minimum far field distance is defined as being approximately 0.5 meters away in some cases, approximately two (2) or more meters away in additional cases, and in particular cases, approximately three (3) or more meters away. It is understood that the minimum far field distance may vary based on environment, e.g., within a vehicle (approximately 0.5 meters to approximately 2 meters), in a room within a home (e.g., approximately 2 meters to approximately 5 meters), or in an entertainment venue such as a concert hall (e.g., approximately 5 meters to approximately 50 meters).

In certain cases, the speaker(s) 20 include a controller 50 and a communication (comm.) unit 60 coupled with the controller 50. In certain examples, the communication unit 60 includes a Bluetooth module 70 (e.g., including a Bluetooth radio), enabling communication with other devices over Bluetooth protocol. In certain example implementations, speaker 20 can also include one or more microphones (mic(s)) 80 (e.g., a single microphone or a microphone array), and at least one electro-acoustic transducer 90 for providing an audio output. The speaker 20 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the controller 50 and a variety of reference data; data generated during execution of any of the variety of programs performed by the controller 50; a Bluetooth connection process; and/or various updateable data for safekeeping such as paired device data, connection data, device contact information, etc. Certain of the above-noted components depicted in FIG. 1 are optional, and are displayed in phantom.

In certain cases, the controller 50 can include one or more microcontrollers or processors having a digital signal processor (DSP). In some cases, the controller 50 is referred to as control circuit(s). The controller(s) 50 may be implemented as a chipset of chips that include separate and multiple analog and digital processors. The controller 50 may provide, for example, for coordination of other components of the speaker 20, such as control of user interfaces (not shown) and applications run by the speaker 20. In various implementations, controller 50 includes a spatialized (audio) rendering control module (or modules), which can include software and/or hardware for performing audio control processes described herein. For example, controller 50 can include a spatialized audio rendering control module in the form of a software stack having instructions for controlling functions in outputting audio to one or more speakers in the system 10 according to any implementation described herein. As described herein, the controller 50, as well as other controller(s) described herein, is configured to control functions in spatialized audio output control according to various implementations.

The communication unit 60 can include the BT module 70 configured to employ a wireless communication protocol such as Bluetooth, along with additional network interface(s) such as those employing one or more additional wireless communication protocols such as IEEE 802.11, Bluetooth Low Energy, or other local area network (LAN) or personal area network (PAN) protocols such as WiFi. In particular implementations, communication unit 60 is particularly suited to communicate with other communication units 60 in speaker(s) 30A, 30B, and device(s) 40 via Bluetooth. In additional particular implementations, the communication unit 60 is configured to communicate with BT devices described herein using broadcast audio over a BLE or similar connection (e.g., including a proxy connection). In still further implementations, the communication unit 60 is configured to communicate with any other device in the system 10 wirelessly via one or more of: Bluetooth (BT); BT low-energy (LE) audio; broadcast (e.g., to one or both NF speakers 30A, 30B, and/or additional device 40) such as via synchronized unicast; a synchronized downmixed audio connection over BT or other wireless connection (also referred to as SimpleSync™, a proprietary connection protocol from Bose Corporation, Framingham, MA, USA); multiple transmission streams such as broadcast, for example, to allow different devices with different pairs of non-occluding near-field speakers (e.g., similar to NF Speakers 30A, 30B) to simultaneously output different portions of an audio signal in synchrony with a first portion of an audio signal. In still further implementations, the communication unit 60 is configured to communicate with any other device in the system 10 via a hard-wired connection, e.g., between any two or more devices.

As noted herein, controller 50 controls the general operation of the FF speaker 20. For example, the controller 50 performs processes in controlling audio and data communication with additional devices (e.g., NF speakers 30A, 30B), as well as audio output, signal processing, etc., at the FF speaker 20. In addition to the general operation, the controller 50 initiates a communication function implemented in the communication module 60 upon detecting certain triggers (or, events), described herein. The controller 50 initiates an operation (e.g., spatialization and/or synchrony of audio output) between FF speaker 20 and NF speakers 30A, 30B based on characteristics of audio content and/or data associated with audio content.

In certain examples, the Bluetooth module 70 enables a wireless connection using Radio Frequency (RF) communication between the FF speaker 20 and NF speakers 30A, 30B (as well as additional device(s) 40, in certain implementations). The Bluetooth module 70 exchanges a radio signal including data input/output through an antenna (not shown). For example, in a transmission mode, the Bluetooth module 70 processes data by channel coding and spreading, converts the processed data into a Radio Frequency (RF) signal and transmits the RF signal. In a reception mode, the Bluetooth module 70 converts a received RF signal into a baseband signal, processes the baseband signal by de-spreading and channel decoding and restores the processed signal to data. Additionally, the Bluetooth module 70 can ensure secured communication between devices, and protect data using encryption.

As noted herein, Bluetooth-enabled devices include a Bluetooth radio or other Bluetooth-specific communication system enabling connection over Bluetooth protocol. In the example illustrated in FIG. 1, FF speaker 20 is a BT source device (otherwise referred to as "input device", or "host device") and NF speakers 30A, 30B are part of a single BT sink device (otherwise referred to as an "output device", "destination device", or "peripheral device") or are distinct BT sink devices. Example Bluetooth-enabled source devices, include, but are not limited to, a smartphone, a tablet computer, a personal computer, a laptop computer, a notebook computer, a netbook computer, a radio, an audio system (e.g., portable and/or fixed), an Internet Protocol (IP) phone, a communication system, an entertainment system, a headset, a smart speaker, a piece of exercise and/or fitness equipment, a portable media player, an audio storage and/or playback system, a smart watch or other smart wearable device, and so forth. Example Bluetooth-enabled sink devices include, but are not limited to, a headphone, a headset, an audio speaker (e.g., portable and/or fixed, with or without "smart" device capabilities), an entertainment system, a communication system, a smartphone, a vehicle audio system, a piece of exercise and/or fitness equipment, an out-loud (or, open-air) audio device, a wearable private audio device, and so forth. Additional BT devices can include a portable game player, a portable media player, an audio gateway, a BT gateway device (for bridging BT connection between other BT-enabled devices), an audio/video (A/V) receiver as part of a home entertainment or home theater system, etc. A Bluetooth-enabled device as described herein may change its role from source to sink or sink to source depending on a specific application.

In various particular implementations, a first speaker in the NF speakers (e.g., NF speaker 30A) is configured to output audio to a left ear of a user, and a second speaker in the NF speakers (e.g., NF speaker 30B) is configured to output audio to a right ear of the user. In particular implementations, the NF speakers 30A, 30B are housed in a common device (e.g., contained in a common housing), or otherwise form part of a common speaker system. For example, the NF speakers 30A, 30B can include in-seat or in-headrest speakers such as left/right speakers in a headrest and/or seatback portion of an entertainment seat, gaming seat, theater seat, automobile seat, etc. In certain cases, the NF speakers 30A, 30B are positioned within the near-field relative to the user's ears, e.g., up to approximately 30 centimeters. In some of these cases, the NF speakers 30A, 30B can include headrest speakers or body or shoulder-worn speakers that are approximately 30 centimeters from the user's ears, or less. In other particular cases, the near-field distance is approximately 15 centimeters or less, for example, where the NF speakers 30A, 30B include headrest speakers. In further particular cases, the near-field distance is approximately 10 centimeters or less, for example, where the NF speakers 30A, 30B include an on-head or near-ear wearable audio device. In additional particular cases, the near-field distance is approximately 5 centimeters or less, for example, where the NF speakers 30A, 30B include an on-ear wearable audio device. These example near-field ranges are merely illustrative, and various form factors can be considered within one or more of the example range of near field as noted herein.

In still further implementations, the NF speakers 30A, 30B are part of a wearable audio device such as a wired or wireless wearable audio device. For example, the NF speakers 30A, 30B can include earphones in a wearable headset that are either wirelessly coupled or have a hard-wired connection. The NF speakers 30A, 30B can also be part of a wearable audio device in any form factor, for example, a pair of audio eyeglasses, on-ear or near-ear audio devices, or an audio device that rests on or around the user's head and/or shoulder region. In particular implementations, the NF speakers 30A, 30B are non-occluding near-field speakers, meaning that when worn, the speaker 30 and its housing do not fully obstruct (or, occlude) the user's ear canal. That is, at least some ambient acoustic signals can pass to the user's ear canal without obstruction from the NF speakers 30A, 30B. In additional implementations, the NF speakers 30A, 30B can include occluding devices (e.g., a pair of over-ear headphones or earbuds with canal sealing features) that may enable hear-through (or, "aware") mode to pass ambient acoustic signals through as playback to the user's ear.

As shown in FIG. 1, the NF speakers 30A, 30B can include a controller 50a, 50b and communication unit 60a, 60b (e.g., having a BT module 70a, 70b), enabling communication between FF speaker 20 and NF speakers 30A, 30B. Additional device(s) 40 can include one or more components described with reference to FF speaker 20, each of which is illustrated in phantom as optional in certain implementations. Notations "a" and "b" indicate that components in devices (e.g., NF speaker 30A, NF speaker 30B, additional device 40) are physically separate from similarly labeled components in FF speaker 20, but can take a similar form and/or function as their labeled counterparts in FF speaker 20. Additional description of these similarly labeled components is omitted for brevity. Further, as noted herein, additional NF speakers 30A, 30B and additional device(s) 40 can differ from FF speaker 20 in terms of form factor, intended usage, and/or capability, but in various implementations, are configured to communicate with the FF device 20 according to one or more communications protocols described herein (e.g., Bluetooth, BLE, broadcast, Simple-Sync, etc.).

In general, the Bluetooth module(s) 70, 70a, 70b include Bluetooth radios and additional circuitry. More specifically, the Bluetooth module(s) 70, 70a, 70b include both a Bluetooth radio and a Bluetooth LE (BLE) radio. In various implementations, presence of a BLE radio in the Bluetooth module 70 is optional. That is, as noted herein, various implementations utilize only a (classic) Bluetooth radio for connection functions. In implementations including a BLE radio, the Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae. The Bluetooth specification, i.e., Bluetooth 5.2: Low Energy, provides the FF speaker 20 with forty channels on 2 MHz spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification. Certain example approaches of Bluetooth-related pairing are described in U.S. Pat. No. 9,066,327 (issued on Jun. 23, 2015), which is incorporated by reference in its entirety. Further, approaches for selecting and/or prioritizing connection between paired devices are described in U.S. patent application Ser. No. 17/314,270 (filed May 7, 2021), which is incorporated by reference in its entirety.

As noted herein, various implementations are particularly suited for spatializing audio output (or otherwise controlling externalization and/or orchestration) at one or more sets of speakers, e.g., NF speakers 30A, 30B and/or FF speaker 20. In certain cases, spatialized audio output is also coordinated at one or more additional device(s) 40. In particular cases, the controller 50 at one or more of the speakers is configured to coordinate spatialized audio output to enhance the user experience, for example, by tailoring audio spatialization based on content type. For example, the user of the NF speakers 30A, 30B can have a more immersive audio experience, and/or a more personalized audio experience, when compared with listening to the audio output without concern for content type.

Figure 2:
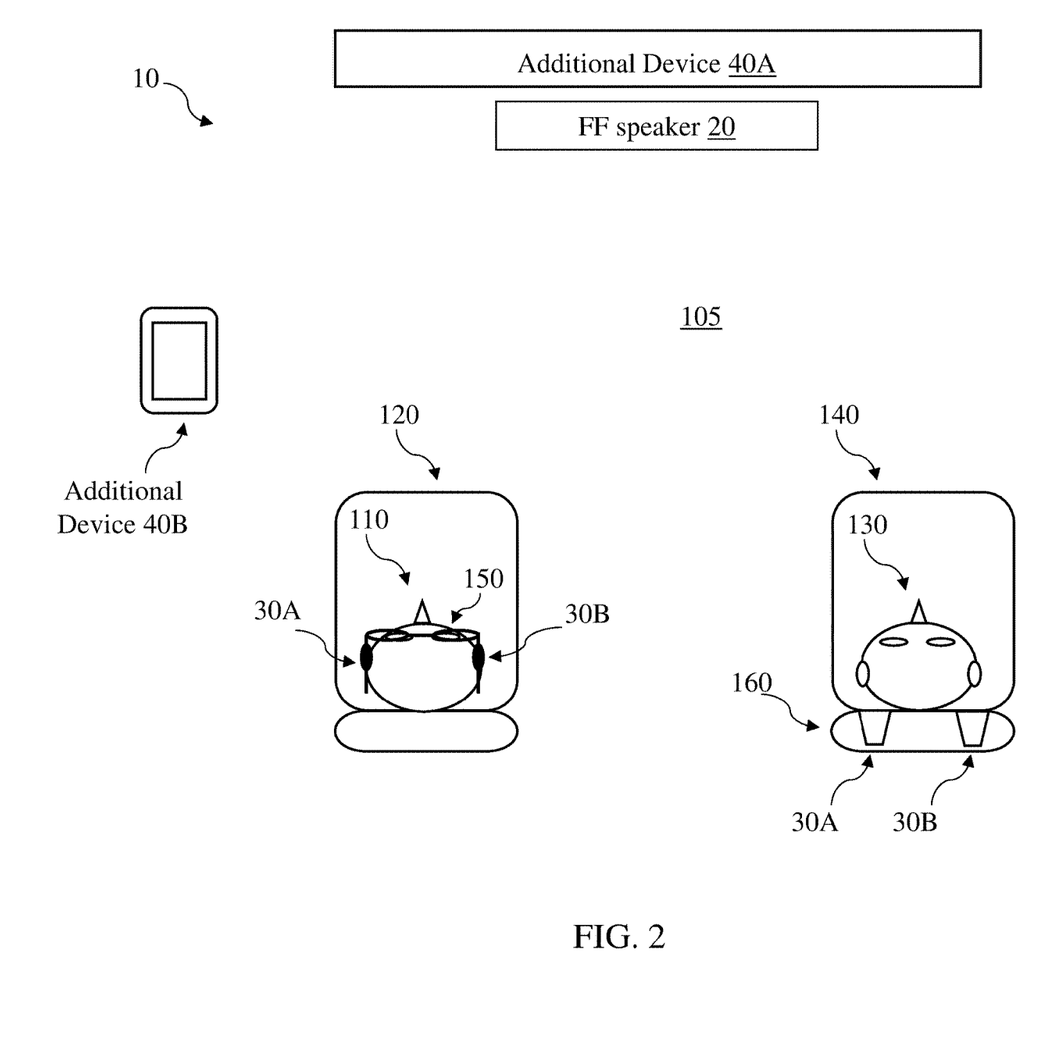
FIG. 2 is a schematic depiction of a space including various speakers according to various implementations.

FIG. 2 illustrates one implementation of an audio system 10 in a space 105 such as a room in a home, office, or entertainment venue. This space 105 is merely one example of various spaces that can benefit from the disclosed implementations. In this example, a first user 110 is present in a first seating location (e.g., seat 120) and a second user 130 is present in a second seating location (e.g., seat 140). User 110 is wearing a wearable audio device 150, which in this example includes a set of audio eyeglasses such as the Bose Frames audio eyeglasses by Bose Corporation of Framingham, MA, USA. In other cases, the wearable audio device 150 can include another open ear audio device such as a set of on-ear or near-ear headphones. In any case, the wearable audio device 150 includes a set of (e.g., two) non-occluding NF speakers 30A, 30B. User 130 is positioned in a seat 140 that includes a set of non-occluding NF speakers 30A, 30B in the headrest and/or neck/backrest portion 160. Also shown in space is a FF speaker 20, which can include a stand-alone speaker such as a soundbar (e.g., one of the Bose Smart Soundbar varieties by Bose Corporation) or a television speaker (e.g., the Bose TV Speaker by Bose Corporation). In additional cases, the FF speaker 20 can include a home theater speaker (e.g., the Bose Surround Speaker varieties and/or Bose Bass Module varieties) or a portable speaker such as a portable smart speaker (e.g., one of the Bose Soundlink varieties or the Bose Portable Smart Speaker, by Bose Corporation) or a portable professional speaker such as the Bose S1 Pro Portable Speaker. In this non-limiting example, additional devices 40A and 40B are present in the space 105. For example, an additional device 40A can include a television and/or a visual display system (e.g., projector-based video system or smart monitor), and additional device 40B can include a smart device (e.g., a smartphone, tablet computing device, surface computing device, laptop, etc.). The devices and interaction of devices in space 105 are merely intended to illustrate some of the various aspects of the disclosure.

With reference to the illustrative example in FIG. 2, according to certain implementations, the audio system 10 is configured to control spatialization of audio output in the FF speaker 20 and/or the NF speakers 30A, 30B. In particular cases, processes performed according to various implementations are controlled by a controller at one or more of the speakers in audio system 10, e.g., controller 50 in FF speaker 20 and/or controller(s) 50a, 50b in NF speaker 30A, 30B (FIG. 1). In some cases, one or more controller(s) 50 is configured to coordinate synchronous audio output at two or more types of speakers, e.g., to aid in spatializing the audio output. Certain features of synchronous audio control are further described in U.S. patent application Ser. No. 17/835,223 (filed Jun. 8, 2022), the entire contents of which are incorporated herein by reference.

Figure 3:
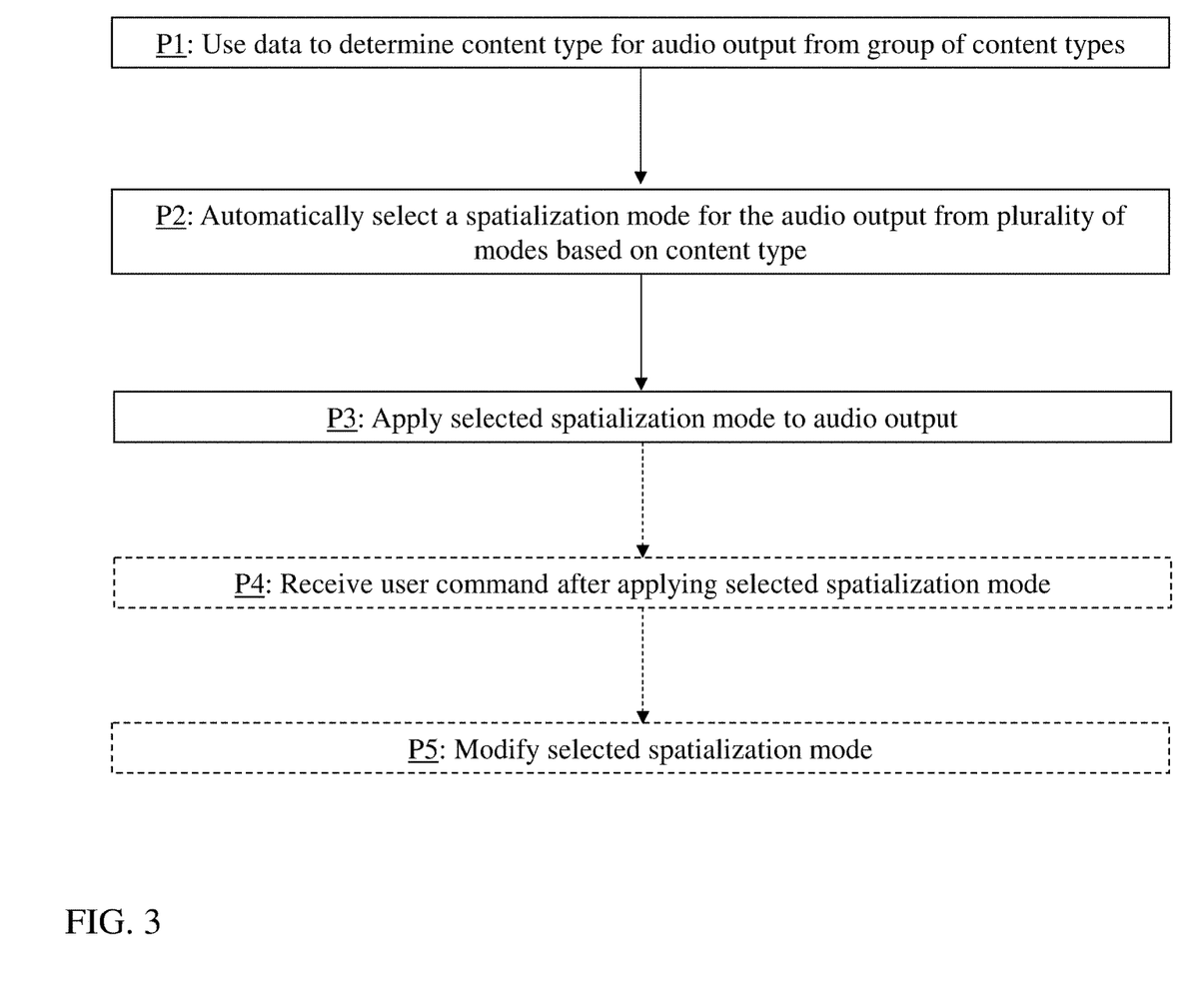
FIG. 3 is flow diagram illustrating processes in a method according to various implementations.
Figure 4:
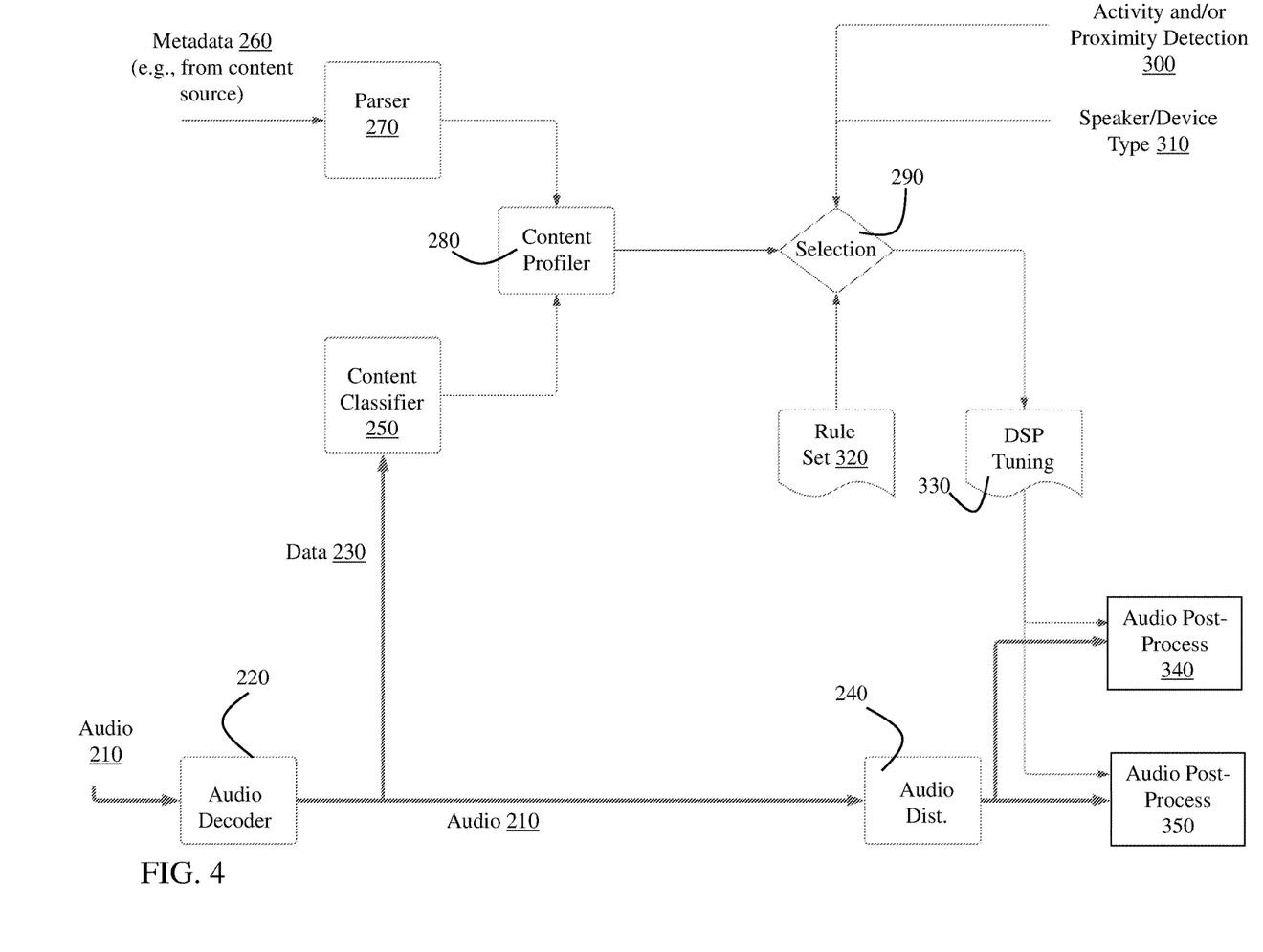
FIG. 4 is a signal flow diagram illustrating approaches for content-based spatialization according to various implementations.

FIG. 3 shows an example flow diagram illustrating processes performed by one or more controllers 50 according to various implementations. FIG. 4 shows an example data flow diagram illustrating further details of the process flow in FIG. 3. With reference to FIG. 3, in a first process (P1), the controller 50 uses data associated with an audio output to determine a content type of the audio from a group of content types. In a particular example, the data associated with the audio output includes audio data and/or metadata associated with the audio to be rendered or output. In particular cases, the data associated with the audio output is obtained with audio data, e.g., as metadata in a file or stream of files, or metadata tag(s) within the audio stream or audio file(s). In other cases, the data associated with the audio output is extracted from the audio data, e.g., using a decoder. In some cases, the data associated with the audio output is identified in the audio data with algorithmic detection, e.g., a machine learning classification algorithm that identifies a style and/or type of audio content in the audio output. In some examples, as shown in FIG. 4, audio (e.g., a file or stream) 210 is obtained from an audio source (e.g., a stored or transmitted audio file and/or a cloud-based audio streaming platform) and an audio decoder 220 separates data 230 about the audio output for use in determining a spatialization setting at the speaker(s). In one example, audio 210 is forwarded to an audio distributor 240 for post-processing and distributing to one or more speakers such as a NF speaker 30A, 30B and/or FF speaker 20. In certain cases, the data 230 is sent to a content classifier 250 for determining the type of content in the audio 210. In particular examples, the content classifier 250 is configured to determine the type of content in the audio 210 based on a dynamic range of a sample of the audio. In particular cases, the content classifier 250 can detect whether the audio content contains characteristics indicative of a content type, e.g., whether it includes dialog, music, crowd noise, etc. Further, in some cases, data 230 data includes data about at least one of, a number of channels in the audio output, encoding information about the audio output, or a type of the audio (e.g., DOLBY Atmos with a 5.1 baseline track and object data such as x-y-z coordinate data).

Additionally, in cases where available, metadata 260 about the audio 210 from an audio source (e.g., television, streaming music service, audio file, etc.) can be sent to a metadata parser 270 to assist in identifying the content type of the audio 210. Metadata parser 270 can be configured to separate metadata relating to the content type of the audio 210, for example, a general content type such as film, television, podcast, sportscast (e.g., live sportscast) or a genre such as action, drama, comedy, news, musical, sports, etc. and send that data about the content type to a content profiler 280.

According to certain implementations, the content classifier 250 can be updated over time, e.g., with more classifier to audio data comparisons and/or adjustments based on user feedback. For example, the content classifier 250 can be updated as additional data 230 is received and corresponding spatialization modes are applied to audio output. In some cases, the controller 50 is configured to update the content classifier 250 based on user feedback such as a user adjustment of audio settings after audio is output in a particular spatialization mode. In additional cases, the controller 50 is configured to update the content classifier 250 after receiving user feedback, e.g., in response to a prompt such as an audio prompt, visual prompt, or tactile prompt at one or more devices such as a wearable audio device. In further cases, the controller 50 monitors audio adjustments made by the user (e.g., via interface(s) at the audio device) in a period following initiation of spatialized audio output, e.g., within a few minutes after initiating spatialized audio output. In a particular example, the content classifier 250 is a machine learning (ML) content classifier, trained on data such as audio data (and audio metadata) and spatialization setting data and configured to determine a content type for the audio output from a group of content types.

In some cases, determining the content type of the data 230 is based on a confidence interval. For example, the content type of the data 230 may not always directly correlate with a predefined content type, and/or may include data indicative of multiple content types. In such cases, the content classifier 250 can be configured to apply a confidence interval to determination of or more content types and select the content type of the data based on the greatest (or relatively highest) confidence interval. In particular cases, the confidence interval includes a probabilistic indicator that the data 230 belongs to one of the groups of content types (e.g., one of two, three, four or more groups of content types). In some examples, the group of content types includes two or more of, i) talk-based audio content, ii)

music-based audio content, iii) theatrical audio content, and iv) live-event audio content. In certain examples, talk-based audio content includes podcasts and talk shows, and music-based audio content includes mixed musical content such as content including music and dialog (which can include descriptive language such as a director's cut or description for aiding the visually impaired).

Figure 5:
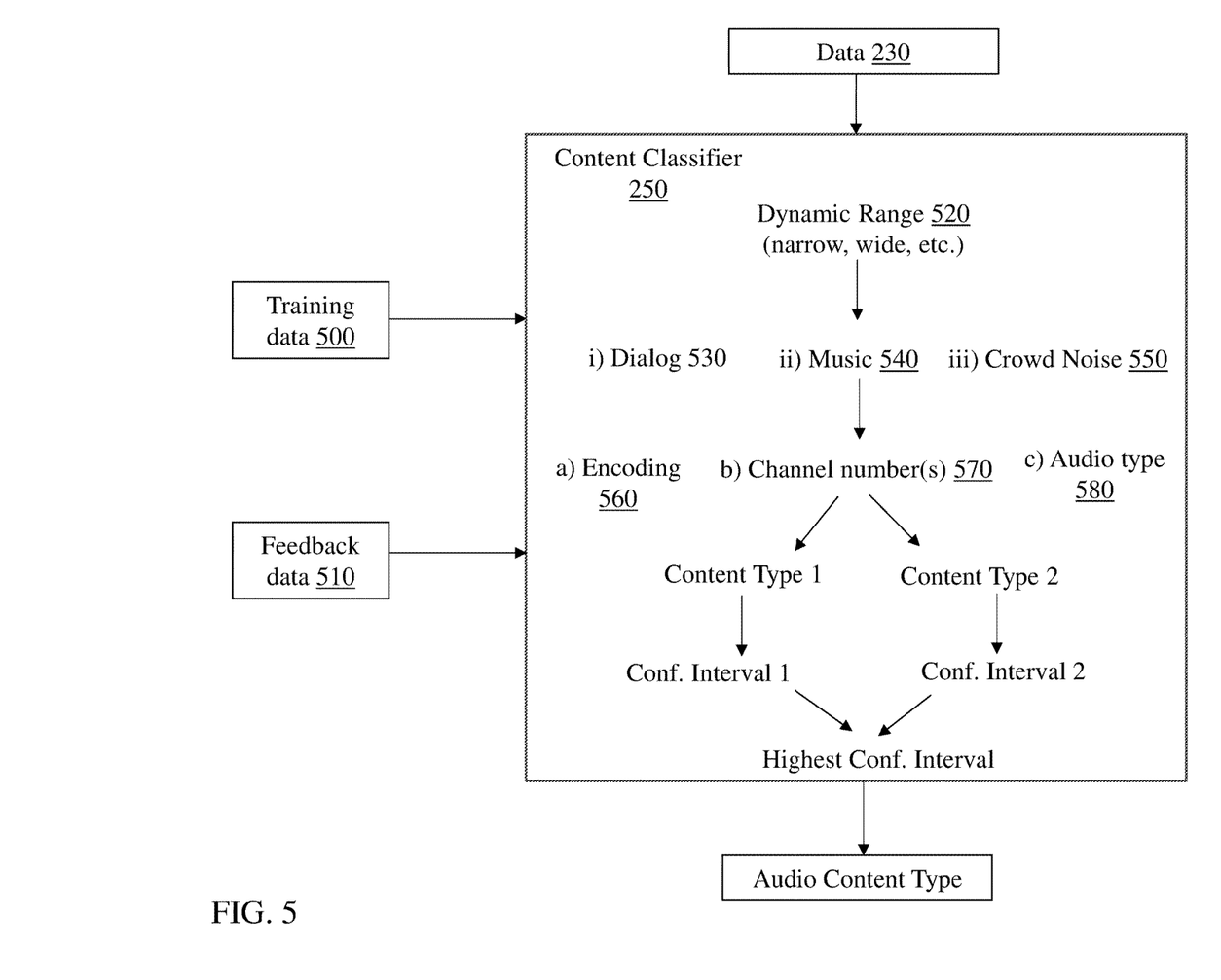
FIG. 5 is a data flow diagram illustrating aspects of content classification according to various implementations.

FIG. 5 illustrates a non-limiting example of data flows in a content classifier 250, which can include a ML content classifier as described herein. In these cases, the content classifier 250 can be trained using training data 500 that includes audio data and/or metadata about audio to develop distinctions in audio characteristics, content types, and/or audio file information. It is understood that the content classier 250 can be updated over time with additional training data 500, as well as feedback data 510 such as user feedback about content type selections for audio output (as described herein). Further, new data 230 can be used to update the content classifier 250 in making future selections of content type. In various implementations, the content classifier is configured to analyze the data 230 (e.g., audio data) for: dynamic range 520; sub-content in the (audio) data 230 such as dialog 530, music 540, crowd noise 550; and/or data file/stream characteristics such as encoding 560, number of channels 570, or audio file type 580. Based on these characteristics of the data 230, the content classifier 250 selects one or more likely content types, e.g., Content Type 1 and Content Type 2 and assigns a confidence interval (e.g., Confidence Interval 1, Confidence Interval 2) to each content type. As described herein, the content classifier 250 can apply a probabilistic approach to determining the content type of the data 230, e.g., using relative confidence intervals. In certain cases, the Content Type with the highest (greatest) confidence interval (e.g., Confidence Interval 2) is selected as the determined content type.

In certain examples, the data 230 may have a wide dynamic range, include crowd noise, and include encoding and/or channel numbers (e.g., multi-channel surround). This data 230 may be primarily indicative of a live event such as a sports broadcast (e.g., Content Type 1), and secondarily indicative of theatrical content (e.g., Content Type 2). Based on a weighting of the above-noted factors, the content classifier 250 can assign a confidence interval to each content type (e.g., Content Type 1, Confidence Interval 1; Content Type 2, Confidence Interval 2) such that the sports broadcast has the highest confidence interval and is selected as the content type. In other examples, the data 230 may have a narrow dynamic range, include music, and include encoding and/or channel numbers indicative of surround sound output. This data 230 may be primarily indicative of musical-based audio content such as classical music content (e.g., Content Type 3), and secondarily indicative of talk-based audio content (e.g., Content Type 4). Based on a weighting of the above-noted factors, the content classifier 250 can assign a confidence interval to each content type (e.g., Content Type 3, Confidence Interval 3; Content Type 4, Confidence Interval 4) such that the musical-based audio content has the highest confidence interval and is selected as the content type. In particular cases, confidence intervals can be based on one or more characteristics of the audio content. For example, energy distribution in the frequency domain, both in and out of the human voice range, may denote speech, singing, or crowd noise. A confidence interval (or simply, confidence) can be determined in part by the difference between energy in this range and the average across the audible spectrum. In further examples, traffic noise may be characterized as infrequent and outside of the vocal range, (e.g., lower energy), dialog may be characterized as differentiating from music (e.g., by differences in energy), a live event such as a concert can be characterized by crowd noise accompanied by musical content, and/or cinematic features may include priority in content sub-types such sound effects or music being prioritized over dialog.

Returning to FIGS. 3 and 4, the output of the content classifier 250 and the metadata parser 270 (if metadata 260 is available) is combined at a content profiler 280 and a spatialization mode selection 290 is made in process P2 (FIG. 3), e.g., based on the content type. In particular cases, the controller 50 makes the spatialization mode selection automatically based on the determined content type, that is, without a user input. After spatialization mode selection 290 is complete, the selected spatialization mode is applied in process P3 (FIG. 3). With reference to FIG. 4, the selected spatialization mode can be applied, e.g., with a digital signal processing tuning profile 330 to audio output signals from audio distributor 240, e.g., for post-processing output at NF speaker(s) 30 (post-processing signals 340) and/or FF speaker(s) 20 (post-processing signals 350).

In particular cases, the group of content types is predefined and includes two or more content types. In further implementations, the group of content types includes at least three distinct content types. In certain cases, the plurality of spatialization modes includes at least two spatialization modes. In further implementations, the plurality of spatialization modes includes at least three distinct spatialization modes. In a particular example, one of the plurality of spatialization modes includes a non-spatialized audio output.

In some aspects, the spatialization mode accounts for at least one of a first order reflection, a second order reflection, or a late reverberation. One aspect of the audio experience that is controlled by the tuning of the speaker system is the sound stage. "Sound stage" refers to the listener's perception of where the sound is coming from. In particular, it is generally desired that a sound stage be wide (sound comes from both sides of the listener), deep (sound comes from both near and far), and precise (the listener can identify where a particular sound appears to be coming from). Further, the sound stage is generally confined by the physical space (e.g., room) in which the user is located. In an ideal system, someone listening to recorded music can close their eyes, imagine that they are at a live performance, and point out where each musician is located. A related concept is "envelopment," by which we refer to the perception that sound is coming from all directions, including from behind the listener, independently of whether the sound is precisely localizable. Perception of sound stage and envelopment (and sound location generally) is based on level and arrival-time (phase) differences between sounds arriving at both of a listener's ears, and sound stage can be controlled by manipulating the audio signals produced by the speakers to control these inter-aural level and time differences. As described in U.S. Pat. No. 8,325,936 ("Directionally Radiating Sound in a Vehicle"), incorporated here by reference, not only the near-field speakers but also the fixed speakers may be used cooperatively to control spatial perception. Additional aspects of spatialization, for example, in open ear, on ear or in-ear audio devices, are described in U.S. Pat. No. 10,972,857 ("Directional Audio Selection"), U.S. Pat. No. 10,929,099 ("Spatialized Virtual Personal Assistant") and U.S. Pat. No. 11,036,464 ("Spatialized Augmented Reality (AR) Audio Menu"), each of which is incorporated here by reference in its entirety.

In certain cases, the spatialization mode is selected with consideration of at least one secondary, or additional factor. Secondary (or, additional) factors can include user movement, proximity to a multimedia device, proximity to an external speaker, proximity to another wearable audio device, or presence in a vehicle. In one example illustrated in FIG. 4, as activity or proximity detection 300, or speaker type 310 (e.g., type of wearable audio device) can be used to aid in spatialization mode selection. Activity or proximity detection 300 can account for whether one or more additional devices (e.g., FF speaker 20, NF speaker(s) 30) is active, and/or proximity between a primary output device such as NF speaker 30 and a FF speaker 20. Information about speaker type 310 can include whether the speaker(s) is a Bluetooth connected speaker, a loudspeaker, an open-ear speaker, an on-ear speaker (e.g., earphone), or an in-ear speaker (e.g., earbud). A rule set 320 assigns a spatialization mode based on the determined content type, and in some cases, activity or proximity detection 300 and/or information about speaker type 310. In a certain example, the rule set 320 can assign synchronization settings (e.g., dictating whether to synchronize audio output) for audio output at a FF speaker 20 (e.g., soundbar) and NF speaker(s) 30 based on activity or proximity detection 300, e.g., based on detecting power cycling of the NF speaker 30, proximity of NF speaker 30 to the FF speaker 20, and/or identifying the type of NF speaker 30.

As noted herein, in particular cases, the controller 50 is configured to select a default spatialization mode for the audio output based on the type of the wearable audio device (e.g., NF speaker 30). For example, in some aspects, the type of wearable audio device includes an in-ear wearable audio device, an on-ear wearable audio device, an over-ear wearable audio device, or a near-ear wearable audio device, and the default spatialization mode is selected based on the type of wearable audio device (e.g., with at least two distinct spatialization modes and at least two distinct device types).

In additional implementations, a user can customize or otherwise configure spatialization modes for audio output, e.g., using feedback to prompts from the controller 50 and/or via an interface (in electronics 100) at the FF speaker 20, NF speaker 30 and/or device 40. In certain examples, an application (e.g., running at device 40) can enable a user to configure and/or customize spatialization modes and related settings according to any approach described herein. For example, the controller 50 can present the user (e.g., via interface at device 40 or other device) with one or more configurable parameters including: a the list of spatialization modes available (e.g., if a user does not like a particular spatialization mode, the user could remove that particular mode from the list available), how the spatialization mode is automatically selected (e.g., whether there is an immediate transition or a smooth transition, such as via a hysteresis period), or other aspects of the techniques described herein. In some embodiments, such user customizations (and/or other user customizations) are saved and linked with a user profile, which can be accessed by the controller 50. In some such embodiments, user customizations (and optionally a user profile setup) can be performed using companion software, such as a companion application that may be accessed from a peripheral device such as device 40 (e.g., a smartphone or tablet computer to which the wearable audio device connects). Further, user configuration and/or customization can be performed at a startup or setup phase of the device(s), and can be edited subsequently via any interface described herein.

In some aspects, the type of wearable audio device (NF speaker 30) includes an open-ear wearable audio device and in response to the controller 50 detecting movement of the wearable audio device, the controller 50 determines whether the data 230 is related to video output (e.g., at additional device 40A and/or 40B). If the data 230 is related to video output, the controller 50 either fixes spatialization of the audio output to a video device providing the video output (e.g., additional device 40A) or disables spatialization. Further, if the data 230 is not related to video output, the controller 50 fixes spatialization of the audio output to a user head position (e.g., as determined with an orientation sensor in additional electronics 100a, 100b at the NF speaker 30). In particular cases, disabling spatialization is adjusted based on a hysteresis factor, for example, a delay of several seconds or less. The hysteresis factor can be used to mitigate false positives in adjusting or otherwise disabling spatialization based on transient, short-term or unintentional head movement by the user.

Orientation of the wearable audio device (e.g., NF speaker 30) can be determined using electronics 100a, 100b that include an orientation sensor. In certain examples, the orientation sensor includes a magnetometer, gyroscope and/or accelerometer. In one example, the orientation sensor includes an inertial measurement unit (IMU). In additional examples, the orientation sensor can include vision-based sensors, such as cameras or lidar. In further examples, the orientation sensor can include Wi-Fi and/or Bluetooth connectivity and be configured to calculate angle of arrival (AoA) and/or angle of departure (AoD) data. In particular examples, the orientation sensor is configured to communicate over local area network (LAN) standards such as IEEE 802.11. In some aspects, the controller 50 is further configured to determine an orientation of the user of the wearable audio device (e.g., NF speaker 30) based on data from the orientation sensor, and adjust the selected spatialization mode based on the determined orientation of the user.

In various implementations, the orientation of the user is determined based on one or more of the look direction of the user, the direction the wearable audio device is pointing in space, or the orientation of the wearable audio device relative to an external audio device such as a speaker in the area. In some aspects, adjusting the selected spatialization mode includes disabling spatialization of the audio output in response to detecting a sudden change in the orientation of the user. A sudden change in orientation can be detected when orientation and/or position of the user changes significantly (e.g., satisfying an orientation/position threshold) within a period. In certain cases, a significant change in orientation or position over a period (e.g., several seconds or less) qualifies as sudden. In further implementations, adjusting the selected spatialization mode is based on at least one head tracking (HT) algorithm selected from, fixed to head HT, fixed to external device HT, or hysteresis HT.

Returning to FIG. 3, in certain additional implementations the controller is configured to apply the selected spatialization mode (P3) only after receiving a user interface command. For example, applying the selected spatialization mode (P3) first requires confirmation via a user interface command, e.g., a voice command, touch command, gesture-based command, etc.). In certain examples, the controller 50 prompts the user to confirm a change in spatialization mode with an audio prompt (e.g., at NF speaker 20) and/or a visual prompt (e.g., at a screen on device(s) 40A, 40B).

In further implementations, for example, as depicted in optional processes (in phantom) in FIG. 3, the controller 50 is further configured, after applying the selected spatialization mode (P3) to: receive a user command at the wearable audio device (P4), and modify the selected spatialization mode based on the user command (P5). In certain cases, the user command includes an audible command (e.g., voice command), tactile command (e.g., via a touch interface or button), or a gesture-based command such as a head shake or look down (e.g., detected via orientation sensor(s)).

In additional implementations, the controller 50 is further configured to adjust the selected spatialization mode as additional data is received, e.g., additional data 230 from audio 210 such as the progression of a stream of audio 210. Additional data can also include data from one or more sensors in additional electronics 100, and/or data from communication unit 60. For example, the controller 50 can adjust the selected spatialization mode in response to detecting the addition of a speaker (e.g., FF speaker 20) to a grouping of speakers connected with NF speaker(s) 30A, 30B. In these examples, the BT module 70a could detect connection or disconnection of a FF speaker 20 to the NF speaker(s) 30A, 30B, or a WiFi module in the communication unit 60 could detect another FF speaker 20 added to or removed from a grouping of speakers in a space 5 via WiFi connection. In response to these detected changes, the controller 50 can further adjust the selected spatialization mode to enhance the audio output at the speakers 30A, 30B in conjunction with (or exclusive of) speakers 20. Further, additional data can include detecting the presence of another NF speaker in space 5 such as via communication unit 60 detecting another BT device nearby or another WiFi device on the network, e.g., to adjust spatialization of audio output for all users in the space 5.

In various implementations, the controller 50 at the wearable audio device (e.g., controller 50a, 50b at NF speaker(s) 30) is configured to coordinate the selected spatialization mode with audio output at one or more speakers external to the wearable audio device, e.g., coordinating output with controller 50 at FF speaker 20 and/or controller 50c at additional device(s) 40. In certain cases, the controller 50a,b at the wearable audio device is configured to coordinate spatialized audio output with additional speakers such as FF speakers 20 including a soundbar, a home entertainment speaker, a smart speaker, a portable speaker, or a vehicle speaker. In these cases or other cases, at least a portion of the controller 50 (e.g., with functionality for coordinating spatialized audio output) is configured to run on a processor at a connected speaker (e.g., FF speaker 20 such as a soundbar, smart speaker, or vehicle speaker) or on a processor at a wearable smart device (e.g., device 40 such as a smart watch, a smart ring, smart glasses, etc.).

While various example configurations of devices and sources are described herein, it is understood that any device in an environment (e.g., environment 105, FIG. 2) can act as a source device, a sink device, and/or a connected device in a grouping of audio devices. For example, the FF speaker 20 and the NF speakers 30A, 30B can be connected with a common source device such as one of the additional devices (e.g., television, audio gateway device, smartphone, tablet computing device, etc.) 40 described herein. For example, the source device can include a television system, a smartphone or a tablet. In additional implementations, the source device includes a network-based and/or cloud-based device such as a network connected audio system. In further implementations, the FF speaker 20 and/or the NF speakers 30A, 30B act as a source device, for example, with integrated network and/or cloud communications capabilities. In such a case, the FF speaker 20 and/or NF speakers 30A, 30B receive audio signals from a network (or cloud) connected gateway device such as a wireless or hard-wired internet router. In one example shown in FIG. 2, the source device can include additional device 40A or 40B is a network and/or cloud-connected device that runs a software program or software application (also called an "app") configured to manage audio output to the FF speaker 20 and/or NF speakers 30A, 30B. In certain examples, the source device is connected with both the FF speaker 20 and/or NF speakers 30A and is configured to coordinate audio output among those speakers, e.g., sending signals to one or both of the FF speaker 20 and the NF speakers 30A, 30B. In additional examples, the source device 210 sends signals to the FF speaker 20 or (one or both of) the NF speakers 30A, 30B, which are forwarded between those speaker connections. In certain implementations, NF speakers 30A, 30B forward signals or otherwise synchronize output via "snooping" type approaches. While particular example scenarios are described herein, the FF speaker 20 and the NF speakers 30A, 30B can forward or otherwise transmit signals in any technically feasible manner, and the examples described herein (e.g., SimpleSync, broadcast, BT, etc.) should not be considered limiting of the various implementations.

According to certain example implementations, such as those illustrated in FIG. 2, the FF speaker 20 is housed in a soundbar such as one of the Bose Soundbars described herein. In still further implementations, the FF speaker 20 includes multiple speakers that are configured to output at least left channel, right channel, and center channels of the audio signal 220 to a space (e.g., space 105). For example, the FF speaker 20 can include a stereo paired set of portable speakers, e.g., portable speakers configured to operate separately as well as in a stereo pair. In additional examples, the FF speaker 20 can include a plurality of speakers in a stereo and/or surround-sound speaker set, such as two, three, four or more speakers arranged in a space (e.g., space 105).

Further, according to certain examples the NF speakers 30A, 30B are configured to coordinate audio output the audio output at the FF speaker(s) 20 in response to a trigger. In particular cases, a trigger can include one or more of: a detected connection between two devices housing the different speakers (such as a wired connection or wireless connection such as BT or Wi-Fi connection such as a Wi-Fi RTT connection), detected directional alignment between two devices housing the different speakers (such as via BT angle of arrival (AoA) and/or angle of departure (AoD) data), a grouping request by a user (such as from an application or a voice command, e.g., via additional device 40B or a wearable audio device such as wearable audio device 150), proximity or location detection (such as devices identified as proximate one another, or within a same zone or space, e.g., via BT AoA and/or AoD data, and/or via Wi-Fi RTT), or a user-initiated command or user response to a prompt following a trigger described herein. Any trigger noted herein can cause the controller 50 at a device coordinate spatialized output based on content type across a plurality of speakers (e.g., in a space such as space 105).

While various implementations include description of non-occluding variations of NF speakers 30A, 30B, in additional implementations, the NF speakers 30A, 30B can include an occluding near-field speaker such as over-ear or in-ear headphones operating in a transparency (or, hearthrough) mode. For example, a pair of headphones that have passive and/or active noise canceling capabilities can be substituted for the non-occluding variation of NF speakers 30A, 30B described herein. In these cases, the occluding near-field speaker can operate in a shared experience (or, social) mode, which can be enabled via a user interface command and/or any trigger described herein. In particular examples, the transparency (or, hear-through) mode enables the user to experience the ambient audio output by the FF speaker 20 while also experiencing the spatialized playback of audio from the NF speakers 30A, 30B.

Additionally, although various implementations are described as beneficially enhancing user audio experiences without necessarily having knowledge of user head position (e.g., via user head tracking capabilities), these implementations may be used in conjunction with systems configured to track user head position. In such cases, data about user head position (e.g., as indicated by an IMU, optical tracking system and/or proximity detection system) can be used as an input to one or more processing components (e.g., at controller(s) 50) to further enhance the user audio experience, for example, by adjusting output of audio signals to NF speakers 30A, 30B and/or FF speaker(s) 20 (e.g., in terms of spatialization, externalization, etc.). However, data about user head position is not necessary to beneficially deploy the approaches and systems according to various implementations.

In any case, the approaches described according to various implementations have the technical effect of enhancing spatialization of audio output for a user based on the detected type of audio content. For example, the approaches described according to various implementations spatialize audio output at one or more speaker systems based on an identified type of the audio content output at those speakers. In certain cases, the approaches select from a plurality of spatialization profiles to provide a best fit for a type of audio content to enhance individual user experiences, as well as a group experience. Further, the approaches described according to various implementations can effectively identify types of audio content with or without content metadata, enhancing the adaptability of a system deploying such approaches. Users of the disclosed systems and methods experience an enhanced, immersive audio experience when compared with conventional systems.

Various wireless connection scenarios are described herein. It is understood that any number of wireless connection and/or communication protocols can be used to couple devices in a space, e.g., space 105 (FIG. 2). Examples of wireless connection scenarios and triggers for connecting wireless devices are described in further detail in U.S. patents application Ser. No. 17/714,253 (filed on Apr. 4, 2022) and Ser. No. 17/314,270 (filed on May 7, 2021), each of which is hereby incorporated by reference in its entirety).

It is further understood that any RF protocol could be used to communicate between devices according to implementations, including Bluetooth, Wi-Fi, or other proprietary or non-proprietary protocols. In implementations where the NF speakers 30A, 30B are housed in a wearable audio device (e.g., FIG. 2), such implementations can advantageously use the wireless protocol(s) otherwise used by the wearable audio device to receive audio data outside of the techniques described herein (such as Bluetooth), thereby eliminating the need for the wearable audio device to include additional componentry and cost.

In implementations that utilize Bluetooth LE Audio, a unicast topology could be used for a one-to-one connection between the FF speaker(s) 20 and the NF speakers 30A, 30B. In some implementations, an LE Audio broadcast topology (such as Broadcast Audio) could be used to transmit one or more sets of audio data to multiple sets of NF speakers 30 (although, the broadcast topology could still be used for only one set of NF speakers 30A, 30B). For instance, in some such implementations, the broadcasted audio data is the same for all of the sets of NF speakers 30 in range, such that all of the sets of NF speakers 30 receive the same audio content. However, in other such implementations, different audio data is broadcasted to the sets of NF speakers 30 in range, such that some NF speakers 30 can select a first audio data and other NF speakers 30 can select a second audio data different from the first audio data. The different audio data could allow for differences in audio personalization (e.g., EQ settings), dialog language selection, dialog intelligibility enhancement, externalization/spatialization enhancement, and/or other differences as can be understood based on this disclosure. Moreover, using the LE Audio broadcast topology (as well as other implementations variously described herein) allows the volume levels of the received audio content to be adjusted locally at each set of NF speakers 30 (as opposed to the single global volume level from the FF speaker(s) 20 in the system 10).

The above description provides embodiments that are compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations.

In some implementations, the host-based elements of the approach are implemented in a software module (e.g., an "App") that is downloaded and installed on the source/host (e.g., a "smartphone," television, soundbar, or smart speaker), in order to provide the spatialized audio output aspects according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

I claim:

1. A wearable audio device comprising:
   at least one audio output device for providing an audio output based on data; and
   at least one controller coupled with the at least one audio output device, the controller configured to
      use the data to determine a content type for the audio output from a group of content types,
      automatically select a spatialization mode for the audio output from a plurality of spatialization modes based on the determined content type, and
      apply the selected spatialization mode to the audio output.

2. The wearable audio device of claim 1, wherein automatically selecting the spatialization mode for the audio output is performed without a user input.

3. The wearable audio device of claim 1, wherein the group of content types is predefined.

4. The wearable audio device of claim 1, wherein the content type is determined using a content classifier, wherein the content classifier is a machine learning content classifier.

5. The wearable audio device of claim 1, wherein analyzing the data includes analyzing metadata to determine the content type.

6. The wearable audio device of claim 1, wherein determining the content type of the data is based on a confidence interval, wherein the confidence interval includes a probabilistic indicator that the data belongs to one of the group of content types.

7. The wearable audio device of claim 1, wherein the group of content types includes at least three distinct content types and wherein the plurality of spatialization modes includes at least three distinct spatialization modes, wherein one of the plurality of spatialization modes includes a non-spatialized audio output.

8. The wearable audio device of claim 1, wherein the group of content types includes two or more of,
   i) talk-based audio content, ii) music-based audio content, iii) theatrical audio content, and iv) live-event audio content.

9. The wearable audio device of claim 1, wherein the controller is further configured, after applying the selected spatialization mode to the audio output, to
   receive a user command at the wearable audio device, and modify the selected spatialization mode based on the user command.

10. The wearable audio device of claim 1, wherein selecting the spatialization mode for the audio output is further based on a type of the wearable audio device, wherein the controller is configured to select a default spatialization mode for the audio output based on the type of the wearable audio device, and
    wherein the type of wearable audio device includes an open-ear wearable audio device and in response to the controller detecting movement of the wearable audio device,
       determining whether the data is related to video output,
       if the data is related to video output, either fixing spatialization of the audio output to a video device providing the video output or disabling spatialization, or
       if the data is not related to video output, fixing spatialization of the audio output to a user head position.

11. The wearable audio device of claim 1, wherein the controller is further configured to coordinate the selected spatialization mode with audio output at one or more speakers external to the wearable audio device, wherein the one or more speakers includes at least one of,
    a soundbar, a home entertainment speaker, a smart speaker, a portable speaker, or a vehicle speaker.

12. The wearable audio device of claim 1, further comprising an orientation sensor, wherein the controller is further configured to,
    determine an orientation of the user of the wearable audio device based on data from the orientation sensor, and
    adjust the selected spatialization mode based on the determined orientation of the user,
    wherein adjusting the selected spatialization mode includes disabling spatialization of the audio output in response to detecting a sudden change in the orientation of the user, and
    wherein adjusting the selected spatialization mode is based on at least one head tracking (HT) algorithm selected from,
       fixed to head HT, fixed to external device HT, or hysteresis HT.

13. The wearable audio device of claim 1, wherein the controller is further configured to select the spatialization mode based on at least one secondary factor including,
    user movement, proximity to a multimedia device, proximity to an external speaker, proximity to another wearable audio device, or presence in a vehicle.

14. The wearable audio device of claim 1, wherein the data includes data about at least one of,
    a number of channels in the audio output, encoding information about the audio output, or a type of the audio.

15. A method of controlling audio output at an audio device, the method comprising:
    using data, determining a content type for the audio output from a group of content types;
    automatically selecting a spatialization mode for audio output at the audio device from a plurality of spatialization modes based on the determined content type; and
    applying the selected spatialization mode to the audio output.

16. The method of claim 15, wherein automatically selecting the spatialization mode for the audio output is performed without a user input, and wherein the group of content types is predefined.

17. The method of claim 15, wherein the data includes data about at least one of, a number of channels in the audio output, encoding information about the audio output, or a type of the audio, and wherein the content type is determined using a content classifier.

18. The method of claim 15, wherein analyzing the data includes analyzing metadata to determine the content type.

19. The method of claim 15, wherein determining the content type of the data is based on a confidence interval, wherein the confidence interval includes a probabilistic indicator that the data belongs to one of the group of content types, wherein the group of content types includes at least three distinct content types and wherein the plurality of spatialization modes includes at least three distinct spatialization modes.

20. The method of claim 15, wherein the group of content types includes two or more of,
   i) talk-based audio content, ii) music-based audio content, iii) theatrical audio content, and iv) live-event audio content,
   wherein selecting the spatialization mode for the audio output is further based on at least one of,
      a type of the wearable audio device, or
      at least one secondary factor including,
         user movement, proximity to a multimedia device, proximity to an external speaker, proximity to another wearable audio device, or presence in a vehicle.

* * * * *